United States Patent

[11] 3,551,669

[72] Inventors Josef Muller;
 Eberhard Lenze, Neheim-Husten, Germany
[21] Appl. No. 705,643
[22] Filed Feb. 15, 1968
[45] Patented Dec. 29, 1970
[73] Assignee Trilux-Lenze KG
 Neheim-Husten, Germany
 a firm.
[32] Priority Feb. 20, 1967
[33] Germany
[31] No. T33246

[54] REPLACEABLE CHASSIS SECTION FOR LIGHT FITTINGS
13 Claims, 14 Drawing Figs.

[52] U.S. Cl. ................................................. 240/73,
 240/9, 240/51.11
[51] Int. Cl. .................................................. F21s 1/02
[50] Field of Search ..................................... 240/73,
 73DA, 63, 66, 51.11, 1.4, 9, 9A, 147, 2

[56] References Cited
 UNITED STATES PATENTS
2,630,522 3/1953 MacDougall ................. 240/78H
2,678,380 5/1954 Westby ......................... 240/51.11
2,798,941 7/1957 Van Dusen .................... 240/147(X)
3,200,244 8/1965 Meyer ........................... 240/2(X)
3,330,952 7/1967 Wince et al. ................... 240/78H
3,379,870 4/1968 Muller et al. .................. 240/73
2,907,872 10/1959 Wilson ........................... 240/66(X)

*Primary Examiner*—John M. Horan
*Assistant Examiner*—Fred L. Braun
*Attorney*—Lowry, Rinehart and Markva ABSTRACT: A wall lighting fitting for sick rooms, hospital wards and the like, which comprises an elongated channel section casing carrying special overhead bed lighting lamps on its outside and two or more chassis units in its interior. Each chassis unit consists of an underchassis permanently mounted inside the casing and a replaceable upper chassis hingedly connected at one end to the underchassis and in operating position attachable to the other end of the underchassis by use of a releasable fastener. For each bed one chassis unit is provided which contains all tapping points for electric power, for the connection of telephone extensions, switch extensions for overhead bed lights, call lights and like services, as well as the associated wiring. All tapping points are accessible through openings in the underside of the casing and in the underchassis. The entire upper chassis and the installational equipment which it contains can be easily removed as a unit. The operation of removing the upper chassis automatically disconnects the entire equipment from the supply. All the contacts on the upper chassis are then accessible without risk of shock. The supply wires and cables secured to the underchassis are all properly insulated and therefore safe so that in the event of a fault or defect the entire upper chassis can be released, removed and replaced by a fresh previously tested chassis already fitted with lamps.

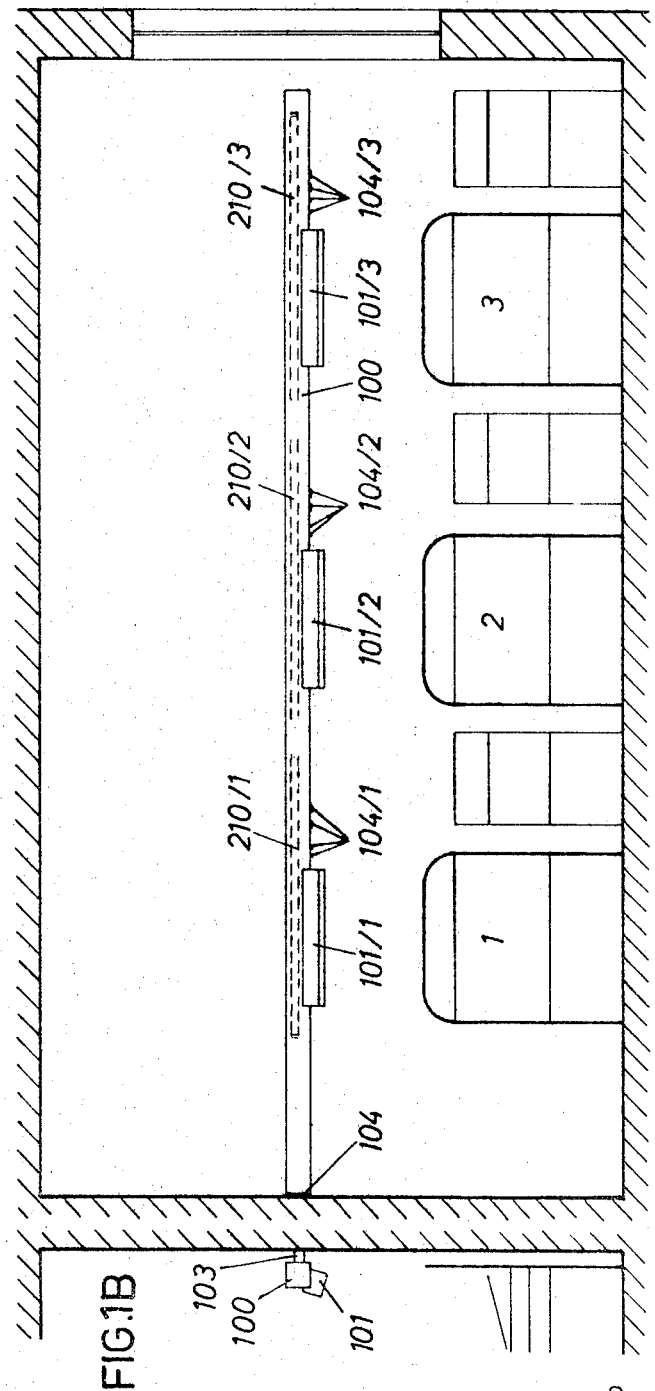
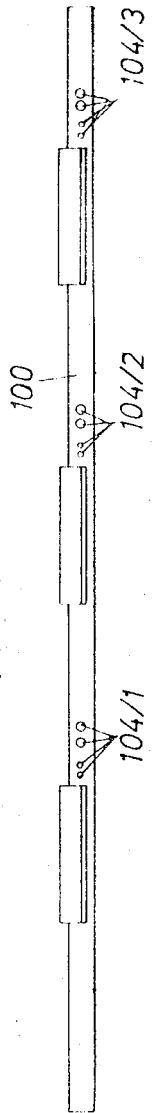

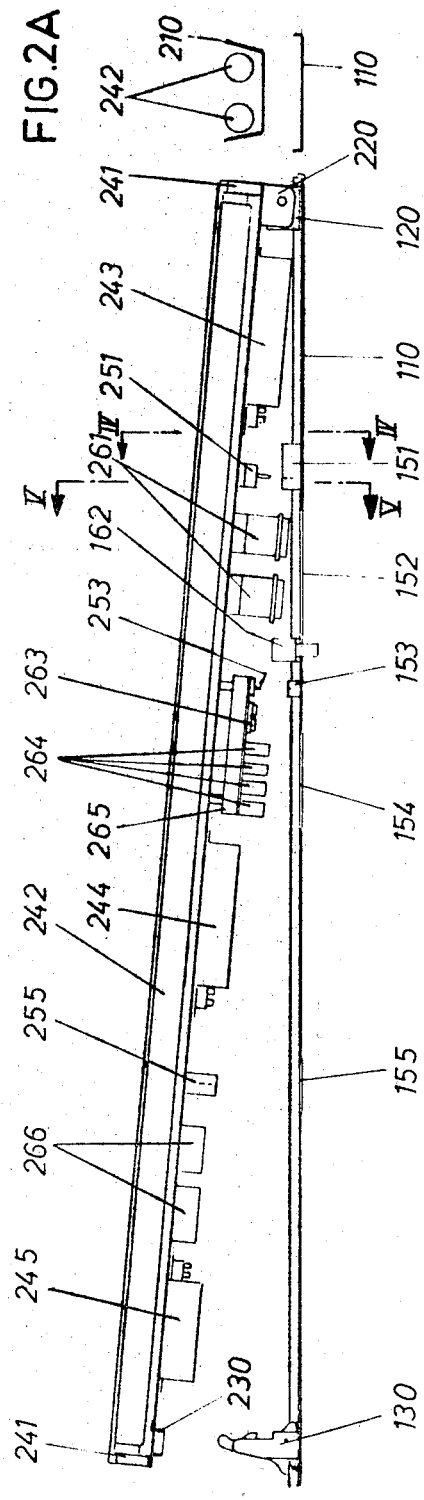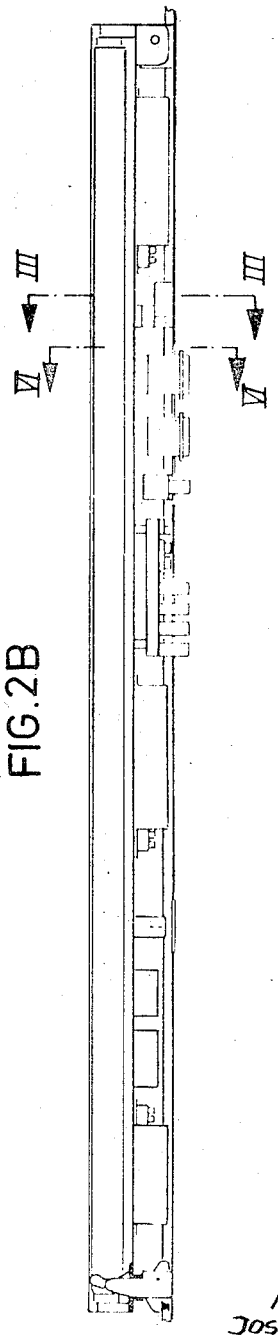

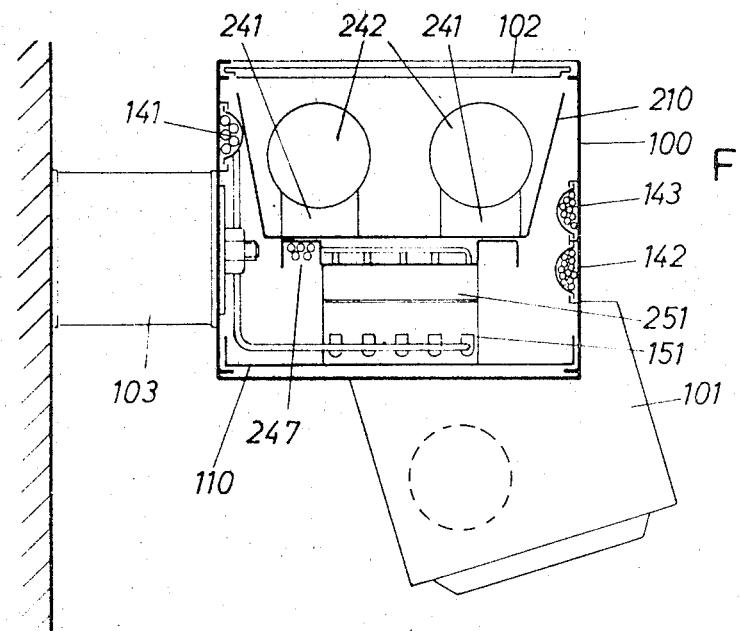
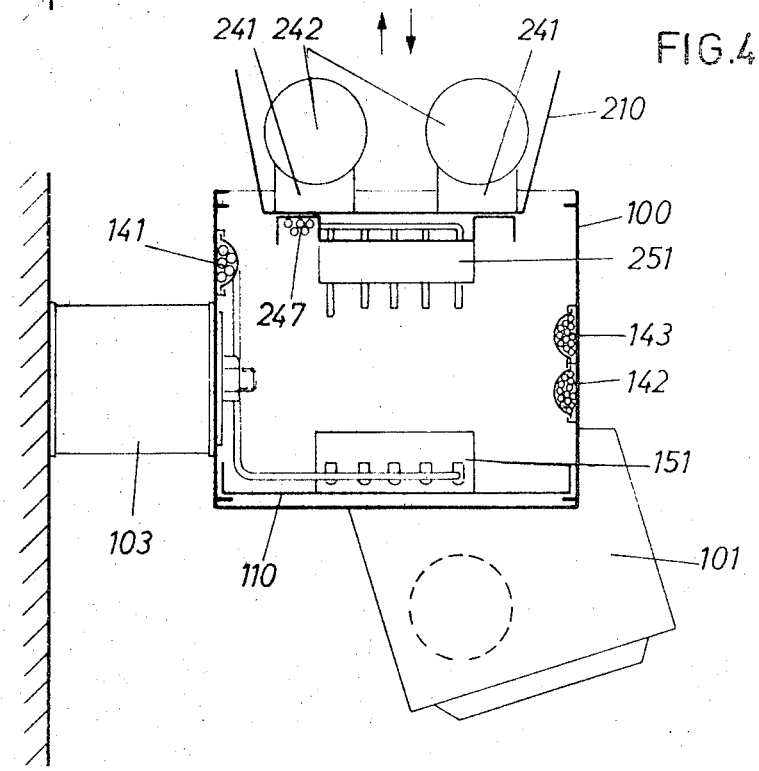

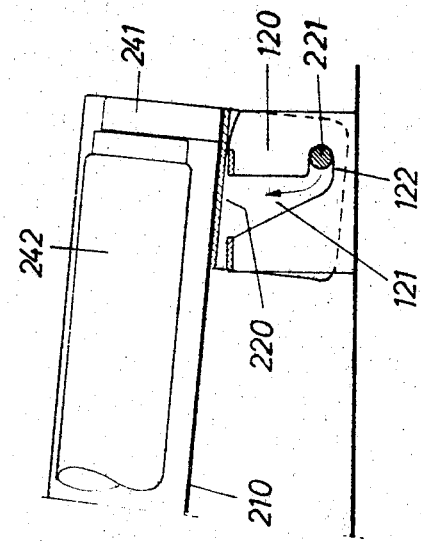
FIG.7
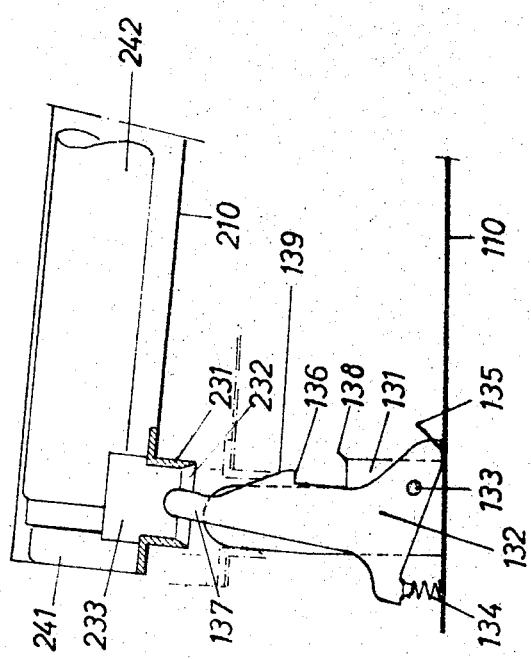
FIG.8
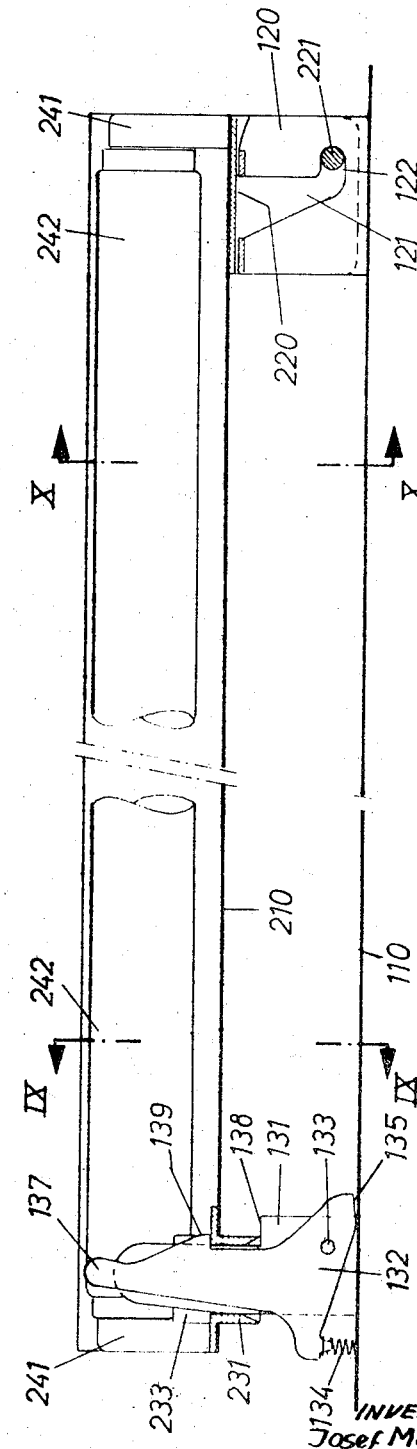

PATENTED DEC 29 1970

INVENTOR
Josef MÜLLER
Eberhard LENZE

By
Lowry Rinehart Markva
attys.

3,551,669

1
REPLACEABLE CHASSIS SECTION FOR LIGHT FITTINGS

BACKGROUND OF THE INVENTION

This invention relates to a wall lighting fitting for sick rooms, hospital wards and the like, comprising an elongated channel-section body or casing for affixation to a wall above one or more beds. This elongated casing may contain strip lighting for the general indirect illumination of the sick room or ward as well as lamps providing individual overhead lighting above the beds, each controllable by switch means from the associated bed.

The elongated casing of the fitting is further provided with tapping points for various services. These may include a multiple tapping box for a variety of facilities available to the patient, such as a switch extension for the starter of the bed lighting fluorescent lamp, a switch extension for operating a call lamp to draw the attention of the nursing staff, earphones for broadcast reception and intercom. Usually at least two power points may also be provided as well as a socket for a telephone.

The proposed wall lighting fitting is thus utilized not only for the purpose of providing illumination, since it also provides all the installational equipment needed for connecting up and operating the electrical facilities and appliances that may be required in an up-to-date sick room or hospital ward.

Besides supply and connecting points which would otherwise be sunk flush into the plaster wall of a sick room or ward the contemplated lighting fitting also contains all the wiring that would otherwise be installed in conduits under the plaster. Only one main supply junction to the fitting is needed, located for instance adjacent a corridor. No interference with existing plastering for installational purposes is therefore involved in the work of mounting such a fitting on a wall, which provides all the services.

SUMMARY OF THE INVENTION

It is thus the object of the present invention considerably to improve the known fittings of this kind.

To attain this object the present invention provides a wall lighting fitting for sick rooms, hospital wards and the like, which comprises an elongated channel-section wall-mounted casing, preferably above the head of the beds, containing lamps as well as tapping points for electric power, for the connection of telephone extensions, switch extensions for overhead bed lights, call lights and like services, as well as the associated wiring, wherein a chassis unit is provided in respect of each bed and contains a complete set of ready-wired shop-fitted components, and wherein all tapping points are accessible through openings in the underside of the casing, each chassis unit consisting of an underchassis permanently mounted inside the casing and a replaceable upper chassis hingeably connected at one end to the underchassis and in operating position attachable to the other end of the underchassis by means of a releasable fastening, the sockets forming the tapping-points being fitted to the underside of the upper chassis and projecting through openings in the underchassis, each chassis unit further comprising disconnecting pin-and-socket couplers of which one member each is affixed to the fixed underchassis and connected to the wiring inside the casing, whereas the cooperating member is affixed to the upper chassis and wired to the several associated tapping points, said disconnecting pin and socket couplers isolating the tapping points when the upper chassis is hingeably raised and reconnecting said tapping points when the the upper chassis is lowered and fastened, the upper chassis in raised position being withdrawable from its hinge.

The proposal to locate the entire wiring for feeding the electrical facilities associated with each bed inside the casing of the wall fitting for a plurality of beds, as proposed by the invention, is the feature which permits all the electrical components associated with each bed to be accommodated in the removable chassis which is automatically coupled into the supply wiring by the disconnecting plug and socket couplers when it is inserted into the fitting. This upper chassis can be safely removed by undoing the fastening, hingeably raising the chassis at one end and withdrawing the same from its open hinge. Conversely, the removable chassis can be inserted into the hinge and then hingeably lowered into operating position. The fastening is suitably contrived to guide the upper chassis during the last part of the lowering motion and thus to locate it with sufficient accuracy before the disconnecting couplers reengage and reestablish the connections to the different tapping points. The lever action easily overcomes the contact pressure.

By making the hingeable upper chassis suitably long the disconnecting couplers can be positioned sufficiently far away from the hinge to ensure that reengagement proceeds through a section of arc which is substantially linear. For ensuring precision of register it is preferred to locate the hinge at a level corresponding substantially to the midpoint of the pins of the disconnecting couplers. Undesirable stressing of the pins and their cooperating sockets is thus avoided.

The proposed method of connecting the removable upper chassis to the fixed underchassis provides the necessary precision of movement to ensure accurate register of the two members of the disconnecting couplers. The guidance afforded by the fastening and its catch also reliably prevents the movable chassis from tilting about its longitudinal axis. In modern hospital wards as many as 24 low amperage tappings as well as 12 to 16 power points are often demanded per bed. The pressure required for the insertion of the pins of the disconnecting couplers into their sockets may in such circumstances be quite considerable, amounting to as much as perhaps 200 g per pin. Nevertheless, it is still easily possible to press the upper chassis into its fastening by hand.

BRIEF DESCRIPTION OF THE DRAWINGS

An embodiment of the invention will now be described by way of example and with reference to the accompanying schematic drawings, in which:

FIG. 1 is a general view of a wall lighting fitting according to the invention mounted on the wall of a hospital ward above the heads of three beds;

FIG. 1A is a bottom view thereof;

FIG. 1B is an end view thereof;

FIG. 2 is a side view of a somewhat opened chassis unit composed of an underchassis and an upper chassis as well as of the installational equipment provided in respect of one bed;

FIG. 2A is a view through the chassis unit;

FIG. 2B is a view similar to that shown in FIG. 2 but showing the chassis unit in closed position;

FIG. 3 is a cross section of the casing and of the two cooperating chassis members on the line III-III of FIG. 2B;

FIG. 4 is a cross section on the line IV-IV of FIG. 2;

FIGS. 7 and 8 illustrate, on a larger scale, the hinge and fastening respectively;

DESCRIPTION OF THE PREFERRED EMBODIMENT

Figure 5:
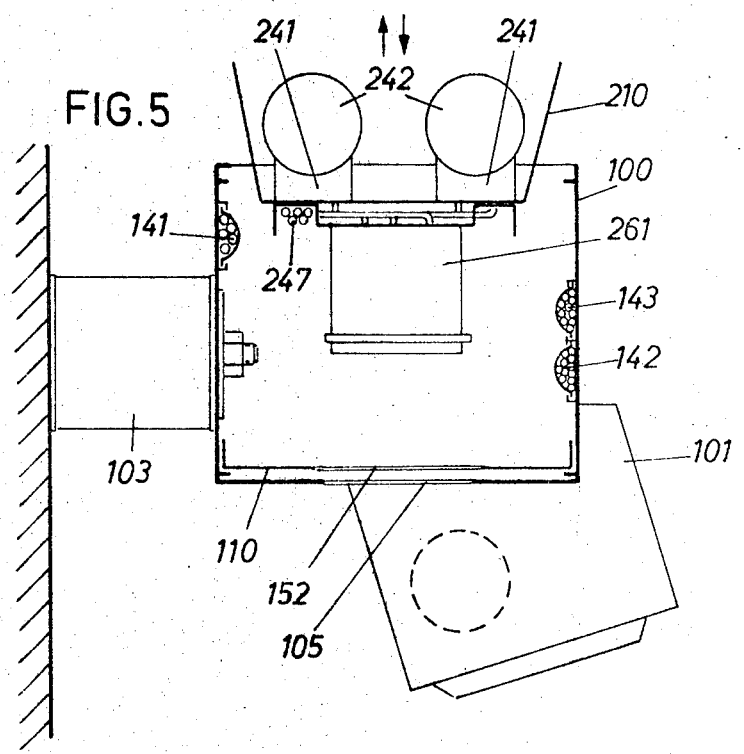
FIG. 5 is a cross section on the line V-V of FIG. 2.

With reference first to FIG. 1 of the drawings this represents three beds 1, 2 and 3 in a sick room or hospital ward. A wall lighting fitting comprising an elongated channel section casing 100 extends across all the beds in the room. At 104 the fitting abuts a sidewall of the room where the supply cables enter. The back of the casing 100 of the fitting is attached to the room wall above the head of the beds by brackets 103.

Above each bed the elongated casing 100 contains a special overhead bed lighting lamp 101/1, 101/2 and 101/3. Moreover, in respect of each bed a set of tapping points 104/1, 104/2 and 104/3 for diverse services, as previously mentioned, s accessible on the underside of the elongated casing 100 as shown in FIG. 1A.

Moreover, in respect of each bed the elongated casing 100 contains a chassis unit in which all the installational components associated with the bed are accommodated. These chassis units are indicated in dotted outlines at 210/1, 210/2 and 210/3 in FIG. 1.

Each chassis unit comprises, as shown in FIGS. 2 and 2B, a chassis 110 fixed to the elongated housing 100 and hereinafter referred to as the underchassis, and an upper chassis 210 hingeably attached thereto. Both are open box section sheet metal members shaped as will be understood from the view shown in FIG. 2A. The upper chassis 210 contains lamps 242 which radiate upwards and provide general indirect illumination for the sick room or ward. For this purpose the inside of the upper chassis 210 may be designed to function as a reflector. The upper chassis is sufficiently rigid for the purpose in question, that is to say to be removed as a unit assembly and to be mounted in the fitting suspended between supports at each end. The right hand end of the chassis unit in FIGS. 2 and 2B is provided with fittings 120 and 220, forming a hinge, whereas the left hand end is provided with fittings 130/230 forming a fastener. The upper chassis is thus capable of being released, swung out of the casing and removed from its hinge. The construction of the hinge and of the fastener will be later described in greater detail.

The following components are mounted side by side on the underside of the upper chassis 210 from right to left in FIG. 2: the hinge fitting 220; a lamp starter unit 243; the plug 251 of a disconnecting coupler for power; two power tapping points 261 for appliances; a printed circuit 265 which carries low amperage outlet sockets 264, trips and associated equipment 263 and the plug 253 of a disconnecting coupler for low amperages; a lamp starter unit 244; a socket 255 for a bedside lamp; a relay for special circuits 266; a lamp starter unit 245, and the fitting 230 forming part of the fastener.

The underchassis 110 is provided with the following mechanical and electrical fittings and arrangements, likewise enumerated from right to left in FIGS. 2 and 2B: the hinge fitting 120; a socket 151 for cooperation with the plug 251 of the coupler for power; an opening 152 for the power outlet socket for appliances; a socket 162 accessible from below for connecting up a telephone extension; a socket 153 for cooperation with the plug of the low amperage coupler 253; an opening 154 for the low amperage outlet sockets 264; an opening 155 for the socket 255 for the bedside lamp, and the fitting 130 forming the other part of the fastener.

When the upper chassis 210 is hingeably lowered onto the underchassis 110 and engages the fitting 130, the above mentioned disconnecting couplers engage and the sockets for connecting up service equipment are moved into positions in which they are easily accessible.

The cross sections in FIGS. 3 to 6 illustrate fittings and elements that are only generally indicated in FIG. 2, on a larger scale. More particularly these figures more clearly show the disposition and construction of the disconnecting plug and socket couplers.

FIGS. 3 and 4 show the disconnecting plug 251 and the socket 151 of the power couplers. The cross-sectional shape of the elongated lamp casing 100 and of the two chassis members 110 and 210 can also be seen. The power coupler comprises a socket 151 on the underchassis 110 and a pin-type plug 251 on the upper chassis 210. Affixed to the side of the casing 100 adjacent to the wall of the room are the power leads 141 to the socket 151. The reference numeral 247 denotes connecting leads on the underside of the upper chassis 210 to the tapping points for outside equipment and for the lamp 242 which extend in the known manner between their mountings 241. 102 is a transparent or translucent cover plate for transmitting the indirect illumination. 142 and 143 are the cables in the casing 100 for low amperage current and telephone.

FIG. 4 shows the upper chassis 210 in course of being hingeably opened. It will be noted that for thus raising and removing the upper chassis only the cover plate 102 need be taken out.

Figure 6:
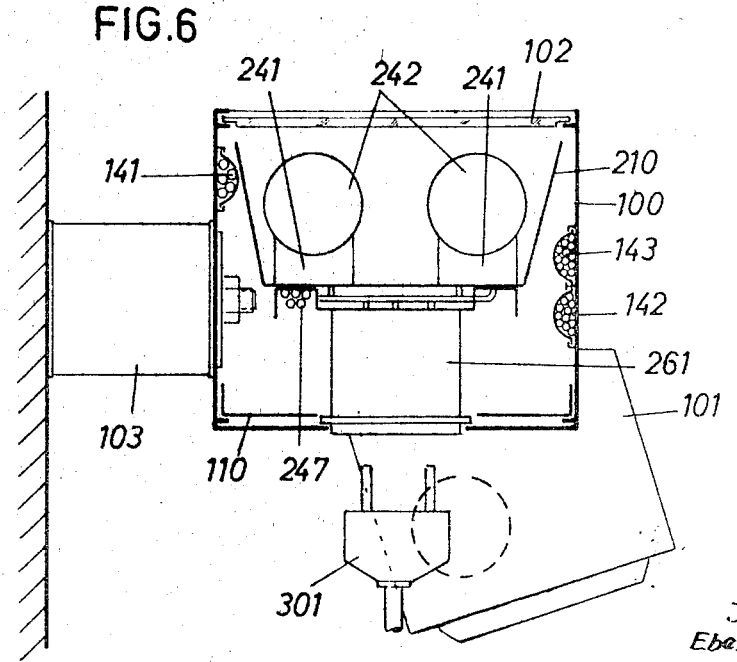
FIG. 6 is a cross section on the line VI-VI of FIG. 2B.

FIGS. 5 and 6 are each a cross-section taken on a line adjacent the power tapping points 261. In FIG. 5 the upper chassis 210 is shown slightly raised, whereas in FIG. 6 it is shown in operative position of use. In this position the outlet sockets 261 for power appear in one or more openings 152 in the underchassis 110 and in a corresponding number of openings 105 in the lamp casing 100. It will be understood from FIG. 6 how the plug 301 of an appliance can be inserted into a socket.

Figure 10:
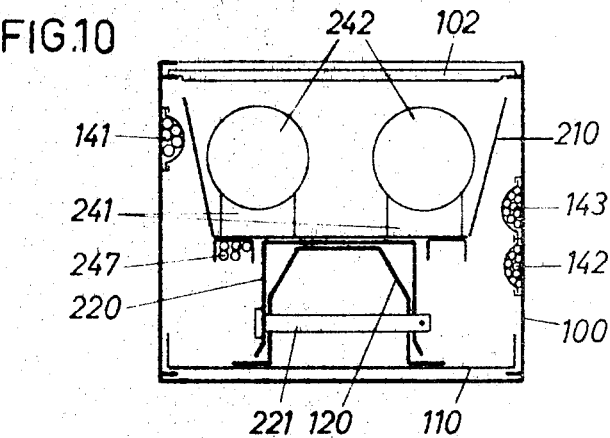
FIG. 10 is a cross section on the line X-X of FIG. 8

The hinge connecting the upper chassis with the underchassis will now be described with reference to FIGS. 7, 8 and 10.

The hinge fitting 120 is slotted for the reception of a hinge pin and is mounted on the underchassis 110. In order to facilitate the insertion of the hinge pin 221 the sidewalls of the fitting are angled towards each other. Each sidewall contains a slot 121 which widens in the upward direction, whereas its lower end curves towards the end of the underchassis 110. This curved end 122 of the slot forms the hinge pin bearing.

The upper chassis 210 carries the cooperating hinge fitting 220 comprising two sidewalls between which the hinge pin 221 is transversely mounted.

For attaching the upper chassis to the underchassis the former is first held at an angle for the insertion of the hinge pin 221, as indicated, from above into the widened ends of the slots 121 until the hinge pin reaches the curved end 122 of the slot. In this part of the slot the hinge pin cannot move upwards or downwards.

The upper chassis can now be hingeably lowered into the casing, the location of the hinge pin in the ends of the slots in conjunction with the two sidewalls 220 reliably preventing lateral tilt.

Figure 9:
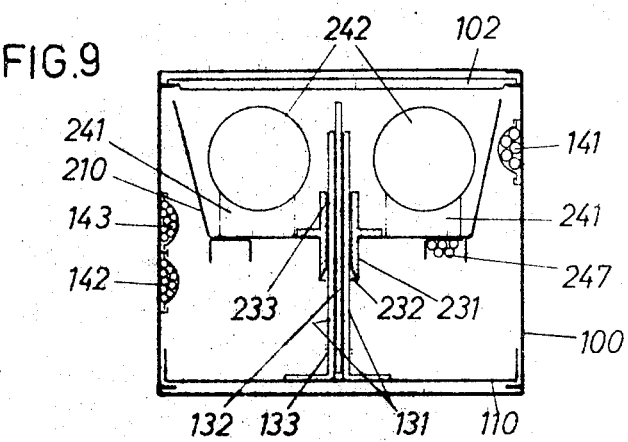
FIG. 9 is a cross section on the line IX-IX of FIG. 8.

With reference now to FIGS. 7, 8 and 9, the other end of the chassis unit carries the fittings forming a fastener. Two parallel flanged plates 131 are mounted vertically on the underchassis 110. Between them a fastener 132 is mounted on a hinge 133. The fastener is loaded by a spring 134 which urges the fastener into the illustrated position in which it is retained by an abutment 135.

The upper chassis 210 carries a guide bush 231 made of plastics. The bush 231 embraces the two flanged plates 131 and thereby locates the free end of the hinged upper chassis before the pins of the disconnecting couplers engage their cooperating sockets. The resilience of the guide bush 231 provides a good fit against the sides of the flanged plates 131 and eliminates lateral tolerances. At the same time pressure is exerted on the upper chassis in its lengthwise direction, urging the hinge pin 221 firmly into its seating. The upper chassis is thus firmly positioned. Moreover, the possible generation of rattle or noise is prevented.

As soon as the bush 231 bears down on a step 138 the upper chassis 210 is in its correct functional position.

The bush 231 first slides down a sloping cam edge 139 of the fastener which yields to the rear until the undercut end 136 of the cam can engage the top of the bush 231. For releasing the fastening the fastener can be withdrawn by means of its upward extension 137.

Instead of being made of a synthetic plastics material the guide bush 231 may consist of some other material which has suitable sliding properties.

In a wall lighting fitting for sick rooms and wards as proposed by the invention the entire upper chassis and the installational equipment which it contains can be easily removed as a unit. No special skill and no tools are required to do this. The operation of removing the upper chassis automatically disconnects the entire equipment from the supply. All the contacts on the upper chassis are then accessible without risk of shock. The supply wires and cables secured to the underchassis are all properly insulated and therefore safe.

The major advantage of a wall lighting fitting for sick rooms and wards as proposed by the invention is that in the event of a fault or defect the entire upper chassis can be released, removed and replaced by a fresh previously tested chassis already fitted with lamps. This work can be done in only a few minutes without inconveniencing or disturbing the patients. The replacement can be carried out by any unskilled person. No electrical connections have to be specially undone or remade. Other units in the wall fitting are not affected and remain fully functional. Nor is it necessary first to switch off the electric supply, since the earth contacts of the disconnecting pin and socket couplers disengage last and reengage first, thereby ensuring complete safety.

The invention also facilitates securing the entire fitting to the wall. The casing 100 can be handled and fixed whilst it it empty, that is to say without the upper chassis having been inserted into each unit. This is a great convenience because the combined weights of the upper chassis for a major number of beds may naturally be considerable. Each upper chassis can be inserted after the basic fitting has been mounted. In conventional wall fittings for sick rooms of the contemplated type the chassis is a fixture inside the casing and owing to its weight the entire fitting is most awkward to handle and difficult to secure to the wall.

It will be understood that for production reasons a person skilled in the art may prefer to design the fastener and the hinge in some other and possibly simpler way than that described and illustrated in FIGS. 7 to 10.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

We claim:

1. A lighting fitting for attachment to a wall in a sick room comprising:
   a. a casing including an elongated channel section having an open side directed upwardly;
   b. at least one chassis unit being disposed in said casing and having a stationary chassis section and a replaceable chassis section;
   c. said stationary chassis section being fixedly mounted inside the casing and said replaceable chassis section being removably mounted on the stationary chassis section with means for removal in an upward direction through said upwardly directed open side of the channel;
   d. said replaceable chassis section including at least one lamp and installation equipment for operating electrical facilities and appliances;
   e. said stationary chassis including means to supply electrical power to the lamp and installation equipment; and
   f. coupling means to electrically connect said lamp and installation equipment to said electrical power supply.

2. A lighting fitting as defined in claim 1 wherein, said casing has a U-shaped cross section and an upper translucent cover plate.

3. A lighting fitting as defined in claim 2 wherein, said removably mounting means for said replaceable chassis section includes hinge means from which the replaceable chassis section may be withdrawn being located on one end of the chassis unit and a releasable fastening means located on the other end of the chassis unit.

4. A lighting fitting as defined in claim 1 wherein:
   said coupling means include pin and socket coupler elements with one of the elements located in the stationary chassis section and the other element being located in the replaceable chassis section; and
   said pin and socket elements being disconnected by raising the replaceable chassis unit.

5. A lighting fitting as defined in claim 4 wherein, said fastening means includes guide means to align the pin and socket elements.

6. A lighting fitting as defined in claim 5 wherein said guide means comprises:
   two guide plates located on the stationary chassis section;
   a guide bush located on the replaceable chassis section to contact said guide plates for guiding the movement of the replaceable chassis section before the pin and socket elements engage; and
   said fastening means includes a fastener member having a catch which engages the guide bush to keep the chassis sections in a working position.

7. A lighting fitting as defined in claim 1 wherein, said installation equipment includes at least one power tapping point which is accessible through apertures in the stationary chassis section, at least one lamp starter unit, at least one low amperage outlet socket and at least one relay.

8. A lighting fitting as defined in claim 7 wherein, said installation equipment includes a lamp socket on the underside of the replaceable chassis which is accessible through apertures in the stationary chassis section.

9. A lighting fitting as defined in claim 1 wherein, said removably mounting means for said replaceable chassis section includes a hinge means from which the replaceable chassis section may be withdrawn located on one side of the chassis unit and the releasable fastening means located on another side of the chassis unit.

10. A lighting fitting as defined in claim 9 wherein, said releasable fastening means comprises:
    two plates projecting outwardly from the stationary chassis section to engage a bush member attached to the replaceable chassis section; and
    a spring-loaded fastener member pivotally mounted on the two plates to engage the bush member when the replaceable chassis section has been hingeably moved into a working position.

11. A lighting fitting as defined in claim 10, wherein:
    the stationary chassis section is mounted below the replaceable chassis section; and
    the hinge means is located at one end of the unit and the releasable fastening means is located at the other end of the unit.

12. A lighting fitting as defined in claim 1 wherein:
    said casing has a U-shaped cross section with the open side thereof directed upwardly; and
    the stationary chassis section comprises the floor of the casing.

13. A lighting fitting as defined in claim 1 wherein:
    said casing has a U-shaped cross section with the open side thereof directed upwardly;
    said casing having a translucent upper cover plate;
    the stationary chassis section being fixedly mounted inside the casing and the replaceable chassis section being mounted for removal in an upward direction through the open side of the casing; and
    said replaceable chassis section having a U-shaped cross section to form a reflector on the inside thereof.